Nov. 24, 1970  C. J. WALL  3,542,523

REACTOR DESIGN

Filed Sept. 8, 1967  3 Sheets-Sheet 1

INVENTOR.
CLARENCE J. WALL
BY:
ATTORNEY.

INVENTOR.
CLARENCE J. WALL
BY:
ATTORNEY.

INVENTOR.
CLARENCE J. WALL

United States Patent Office 3,542,523
Patented Nov. 24, 1970

3,542,523
REACTOR DESIGN
Clarence J. Wall, Westport, Conn., assignor to Dorr-Oliver Incorporated, Stamford, Conn., a corporation of Delaware
Filed Sept. 8, 1967, Ser. No. 666,298
Int. Cl. B01j 1/00, 9/18
U.S. Cl. 23—284                                     13 Claims

ABSTRACT OF THE DISCLOSURE

A fluidized bed reactor having an expanded bed relative to the freeboard, a plurality of circumferentially disposed cooling coils positioned in pockets in the expanded portion of the bed and a separably operable peripheral windbox underlying each pocket.

---

In many fluidized bed combustion systems the reactions taking place in the bed are exothermic, i.e., one of the products of the chemical union or decomposition is heat. The roasting of pyrite, for example, generates approximately 2–3 million B.t.u. of excess heat per ton of feed, depending upon such diverse factors as the percentage of moisture in the feed and the feed analyses, etc. This excess heat is of major importance in most roasting systems because the bed temperature is a critical operating factor and must be maintained within reasonably close parameters to sustain the reaction. Thus, there has evolved, in the art, the problem of how to most effectively remove the excess heat generated by the reaction before it can alter the bed temperature. This is an especially significant problem in a fluidized bed reactor because one of the inherent properties of a fluidized bed is the almost instantaneous transfer of heat between the particles of the bed and the resulting temperature homogeneity.

Some of the more common methods of extracting this excess heat include the recycling of cooled exhaust gases through the bed and the direct injection, and subsequent evaporation, of water in the bed. The most prevalent method, however, is the removal of heat by generation of steam in hollow metal coils submerged in the bed. This method has found the most favor because of the relative ease with which it can be adjusted to meet a variety of heat generating situations, because of the close control it affords and because it recovers a usable product, i.e., steam. The method does, however, have its disadvantages; principal among these is that the coils have to be in place when the reactor is started up. As the bed is heated to operating temperature, water has to be run through the coils to prevent them from overheating. This water extracts heat from the fluid bed thereby prolonging the time required for preheating the bed and increasing the fuel required for preheating.

Still another disadvantage of the steam generating coils is that to remove old coils and/or install new coils requires a complete shutdown of the reactor. The bed must be thoroughly cooled and then the reactor emptied to facilitate entrance by workmen into the reactor and the transfer of the coils. This not only entails a loss of operating time but also a considerable quantity of reactor bed material is lost by its draining out of the reactor.

It is therefore an object of the present invention to overcome the above disadvantages of utilizing steam generating coils to control the bed temperature of a fluidized bed. Applicant is able to attain the desired advantages without the attendant disadvantages by expanding the fluidized bed in a transverse direction relative to the freeboard portion of the reactor. The steam generating coils are supported from above and are inserted longitudinally into the bed adjacent the inner wall of the reactor and are positioned in the expanded portion of the bed. The horizontal wall portion of the reactor overlying the coils, and corresponding to the top of the expanded portion of the fluid bed, has removable sections, so that the coils can be inserted and removed by a suitable crane, or other lifting device, without the necessity of personnel entering the reactor. In addition, applicant has provided a plurality of windboxes circumferentially disposed about the periphery of the reactor, underlying the expanded portion of the bed and the coils and separably operable from the main windbox and from each other. In this manner, by providing a slight negative pressure in the reactor, to prevent loss of gas, applicant can separately and selectively defluidize that portion of the bed surrounding each set or bank of coils or so adjust the space rate of that portion of the bed as to be able to remove one or more coils while the remainder of the bed is still in operating condition.

Thus, for example, during the start-up phase of the reactor operation the bed can be heated to the desired reaction range without the heat absorbing coils in the bed. Once the operating temperature is attained a negative pressure can be imposed in the reactor, the peripheral portions of the bed can be defluidized and the coils lowered into position. The same procedure would be followed should a bank of coils need replacing; i.e., a negative pressure imposed on the reactor, the overlying horizontal portion of the reactor wall removed, the corresponding portion of the bed either defluidized or the space rate properly adjusted, the old coils removed, and a new set lowered into position.

Alternatively, during start-up, the coils can be in position in the bed during the preheat operation. However, instead of fluidizing the entire bed, which would account for a heat drain on the bed, as discussed above, the peripheral windbox would not be activated and thus the feed material in the pockets would not be fluidized. There would only be a minimal heat transfer from the fluidized portion of the bed through the defluidized material in the pockets so that little or no cooling water would have to be run through the coils during the preheat phase of start-up. In any event, the minimal heat transfer between the defluidized and fluidized portions of the bed will effectively negate any heat loss due to cooling water in the coils. When the desired operating temperature is reached the flow of cooling water in the coils can be activated or increased, the pockets then fluidized and normal operation begun.

Still another advantage of applicant's reactor is its adjustability to varying operating conditions. The reactor can be designed to have a maximum size bed with the cooling coils having sufficient area to control the temperature of that bed. If, for example, a particular set of operating parameters requires a smaller bed, then selected parts of the expanded portion of the bed can be defluidized and the cooling coils either removed or just enough water run through to counteract the minimal heat transfer between the fluidized and defluidized portions of the bed. In a similar manner, the cooling capacity of the bed can be adjusted by selectively activating and deactivating different parts of the expanded portion of the bed.

It is therefore another object of the present invention to provide a transversely expanded fluidized bed relative to the freeboard section of a fluidized bed reactor.

It is yet another object of the present invention to provide a plurality of separably and selectively operable windboxes circumferentially disposed about the periphery of the fluidized bed of a fluidized bed reactor.

It is still another object of the present invention to provide a plurality of removable, heat absorbing, steam generating coils in the fluidized bed of a fluidized bed reactor.

It is still yet another object of the present invention to provide a plurality of circumferentially disposed separately fluidized pockets in the interior wall of a fluidized bed reactor.

The subject matter which applicant regards as his invention is particularly pointed out and distinctly claimed in the concluding portion of this specification. The invention, however, as to its organization and method of operation together with further objects and advantages thereof will best be understood by reference to the following description taken in conjunction with the accompanying drawings in which:

Figure 1:
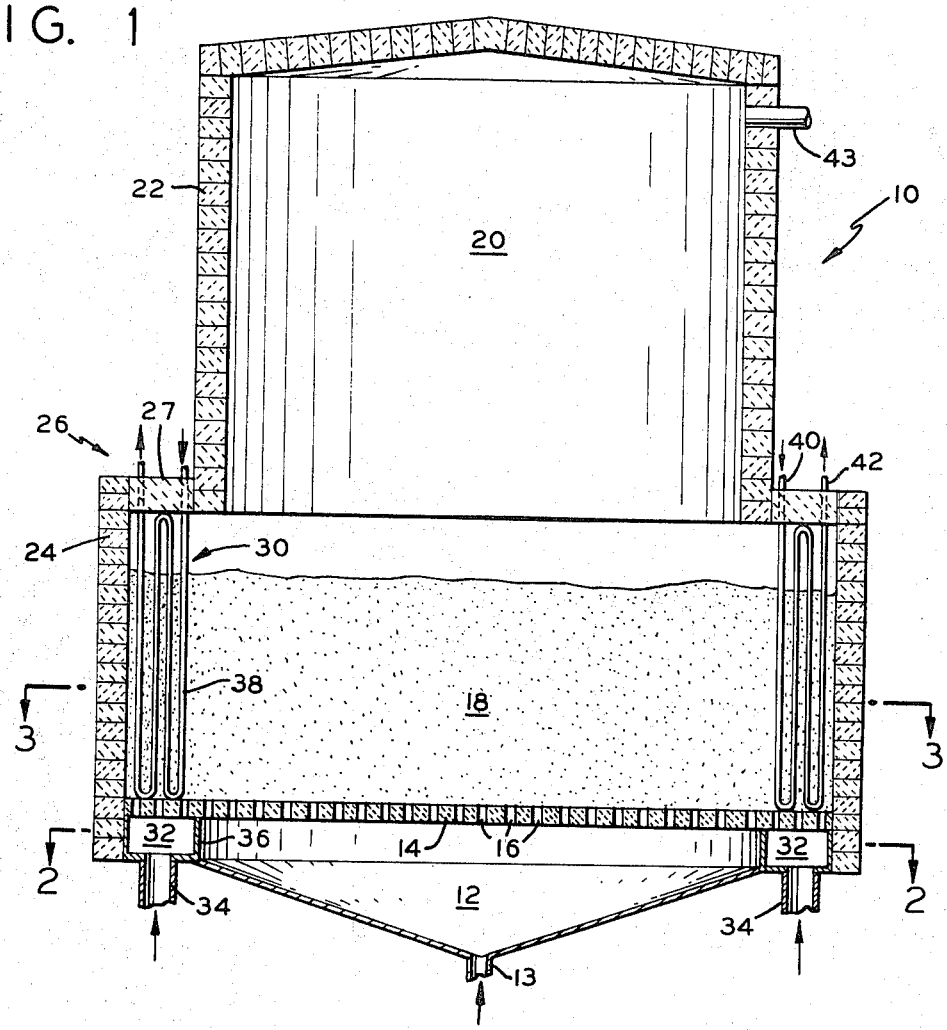
FIG. 1 is an elevational view in section which is a diagrammatic representation of a fluidized bed reactor incorporating the present invention.

Referring now to FIG. 1 the fluidized bed reactor incorporating the instant invention will be briefly described. A fluidized bed reactor is basically a vertical furnace which is divided by a transverse, horizontally extending, gas permeable constriction plate into a windbox compartment below the plate and a heat treatment compartment above the plate. A bed of the feed material to be treated is supported on the plate and maintained in a fluidized state by air, or other oxygen bearing gas, being introduced through the constriction plate into the bed. The pressure of the fluidizing gas causes the solids to take on the appearance and many of the properties of a boiling liquid, i.e., a fluid level is present, there is almost instantaneous heat transfer and equalization of temperature throughout the bed, and the particles are constantly changing position relative to each other. The constant flux and movement of the bed particles causes the finer particles and dust to become entrained in the gaseous stream and rise with the gas through the bed and into the freeboard space above the bed. Solids to be treated can be fed either onto the top of the bed or injected directly into the bed and the reacted products are removed directly from the bed.

Figure 2:
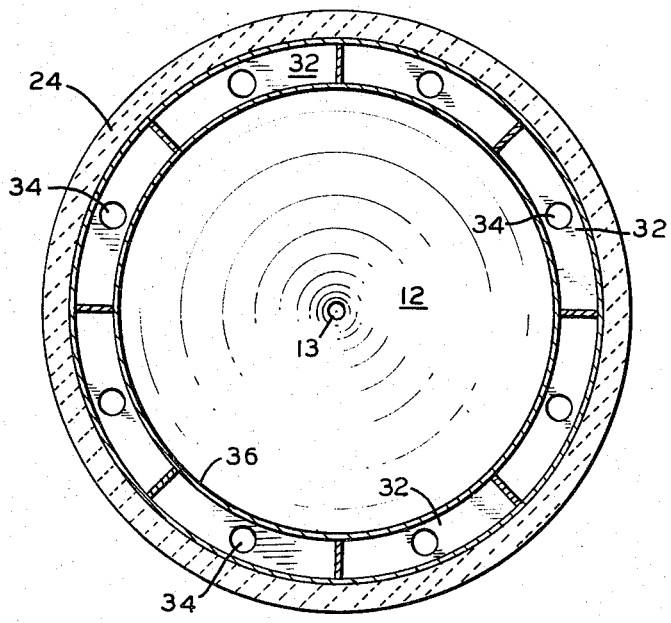
FIG. 2 is a plan view in section taken along the line 2—2 of FIG. 1.
Figure 3:
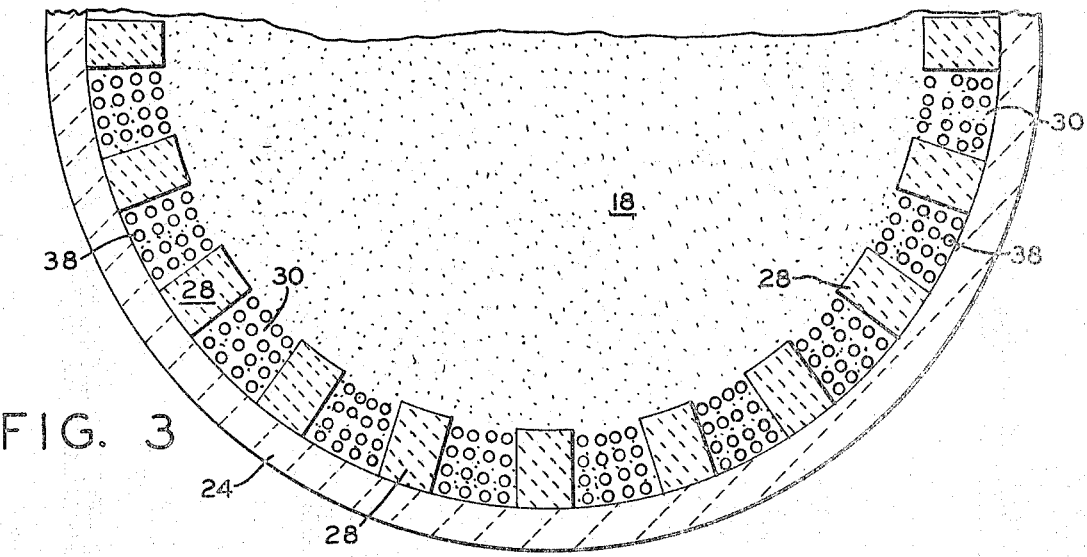
FIG. 3 is a plan view in section taken along the line 3—3 of FIG. 1.

Looking now in particular to FIGS. 1–3 the fluidized bed reactor 10 comprises a primary windbox 12, a fluidizing gas supply conduit 13 feeding into the primary windbox, an overlying transverse constriction plate 14 having a plurality of orifices or tuyeres 16, an expanded fluidized bed 18 supported on the constriction plate and a freeboard 20 overlying the fluidized bed. Viewed in an elevational cross-section as in FIG. 1 the reactor 10 has a stepped configuration; the longitudinal outer shell 22 of the freeboard being concentric with, and having a smaller diameter than, the longitudinal outer shell 24 of the expanded fluidized bed. The two longitudinal outer shells 22, 24 are joined together by a transverse annular wall 26 which, as will be explained in greater detail below, has removable portions 27 permitting direct access to the interior of the reactor.

A plurality of longitudinally extending circumferentially spaced piers 28, constructed of firebrick or other refractory material, are disposed about the interior surface of shell 24 to define, in conjunction with the constriction plate 14 and transverse wall 26, pockets 30. Each of the peripheral pockets 30 overlies an extension of the constriction plate 14 and has its own separably and selectively operable windbox 32, which, in turn, has its own fluidizing gas supply conduit 34 and is separated from the primary windbox 12 by a circumferentially extending longitudinal wall 36. Thus, the feed material in each of the pockets 30 can be separably and selectively fluidized, defluidized or can have a different space rate from the remainder of the fluidized bed by controlled actuation of the individual fluidizing gas supply conduits 34 to the peripheral windboxes 32.

As stated above, portions 27 of the transverse wall 26, correspondingly overlying the pockets 30, are removable to permit direct access to the interior portion of the reactor 10. A plurality of longitudinally extending steam generating coils 38 are supported from above and are lowered into position in the pockets 30 through the corresponding openings 27 in the transverse wall 26. Each set or bank of coils 38 has a water inlet 40 and a steam outlet 42. The coils maintain the temperature of the bed within the desired operating range by absorbing the exothermic heat generated by the chemical reaction taking place in the bed.

During operation, for example start-up, the fluidized bed can be heated to the desired reaction temperature range by preheat devices (not shown), which are well known in the art, without the heat absorbing, steam generating coils in the bed. If the coils were in position in the bed during start-up, as is the case in the prior art, cool water would have to be run through the coils to prevent them from overheating. One of the inherent properties of a fluidized bed reactor is the almost instantaneous transfer of heat between the particles of the bed and the resulting temperature homogeneity. Thus, the water in the coils would absorb the heat now being supplied by auxiliary fuel which not only increases the operating cost but also increases the time factor in the preheat cycle. Without the coils submerged in the bed this disadvantage is obviated because all the heat value of the auxiliary fuel is now used to bring the reactor up to the desired operating temperature.

Once the temperature of the fluidized bed is within the reaction range and before additional feed material is added the coils can be lowered into position to maintain the desired temperature range. A negative pressure is placed on the reactor by any known suction means (not shown) operating either directly at the freeboard discharge 43 or further along in the discharge flow sheet, e.g., through the waste heat boiler (not shown) or the electrostatic precipitator (not shown) etc. When there is a sufficient pressure differential between the exterior and interior of the reactor, the fluidizing medium supply to the affected peripheral windbox is adjusted to either defluidize the corresponding pocket 30 or so adjust the space rate relative to the space rate of the remainder of the fluidized bed as to allow easy insertion of the coils. The choice between complete defluidization of the affected pocket or an adjustment of the space rate in the pocket relative to the space rate of the remainder of the bed, depends to a large extent upon the type and particle size of the fluidized medium, i.e., whether a sticky mass or individual particle, when defluidized and the number of coils in the coil bank. When the space rate adjustment is made to the affected pocket 30 the corresponding portion of the transverse wall 26 is opened and the bank of coils, supported from above, is lowered into position in the fluidized bed. Since the pressure outside the reactor is greater than the pressure inside the reactor there will be no loss of feed material or escape of any noxious gases to the surrounding atmosphere. Once the coils are in position, the coils are quickly hooked up to a water supply (not shown) and a steam exhaust (not shown) and the bank is ready for operation. The corresponding portion of the transverse wall 26 is then closed, the suction is released and the operating pressure is restored to the interior of the reactor.

The same cycle would be used if it became necessary to remove an old bank of coils and replace them with a new bank while the reactor continued in operation.

Figure 4:
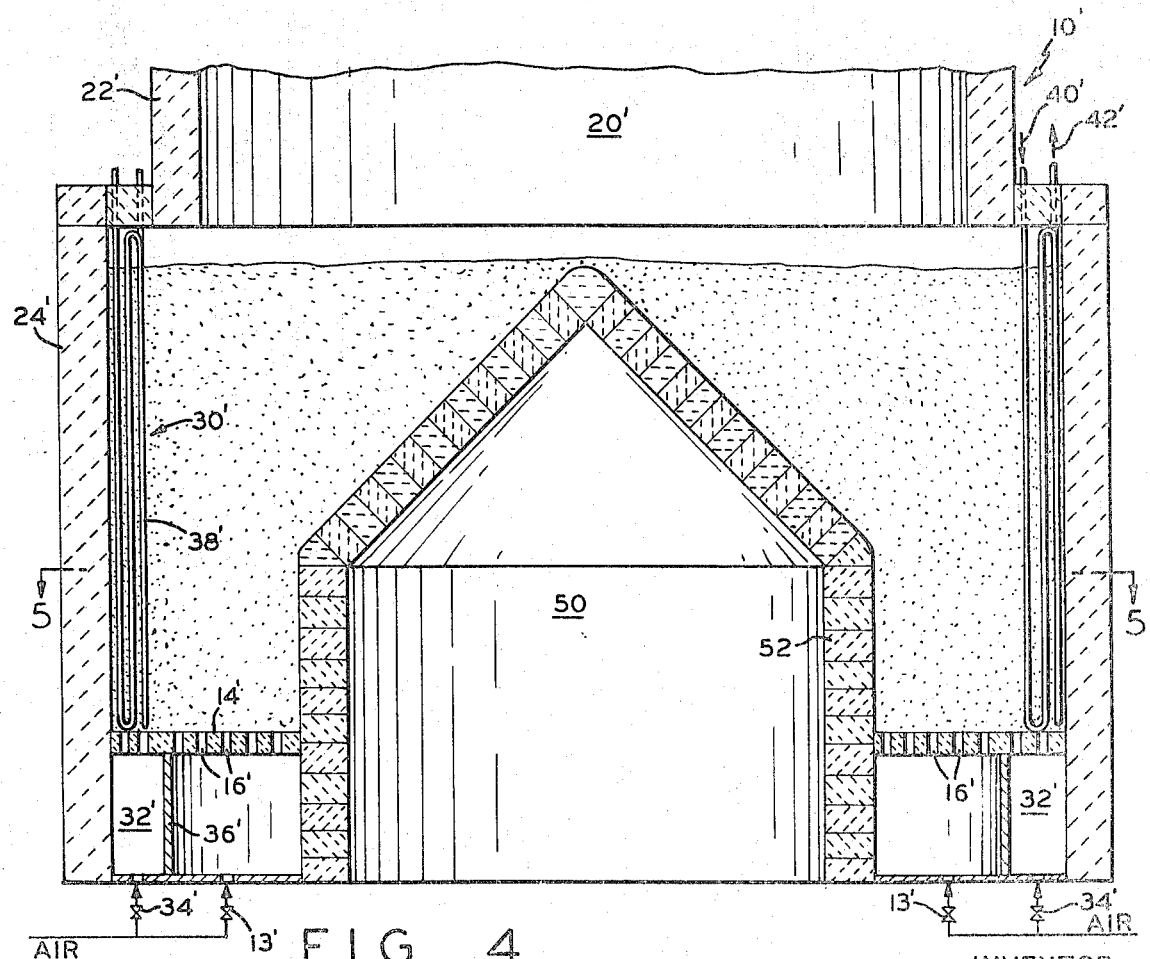
FIG. 4 is an elevational view in section depicting a fluidized bed reactor specially modified to incorporate the present invention.
Figure 5:
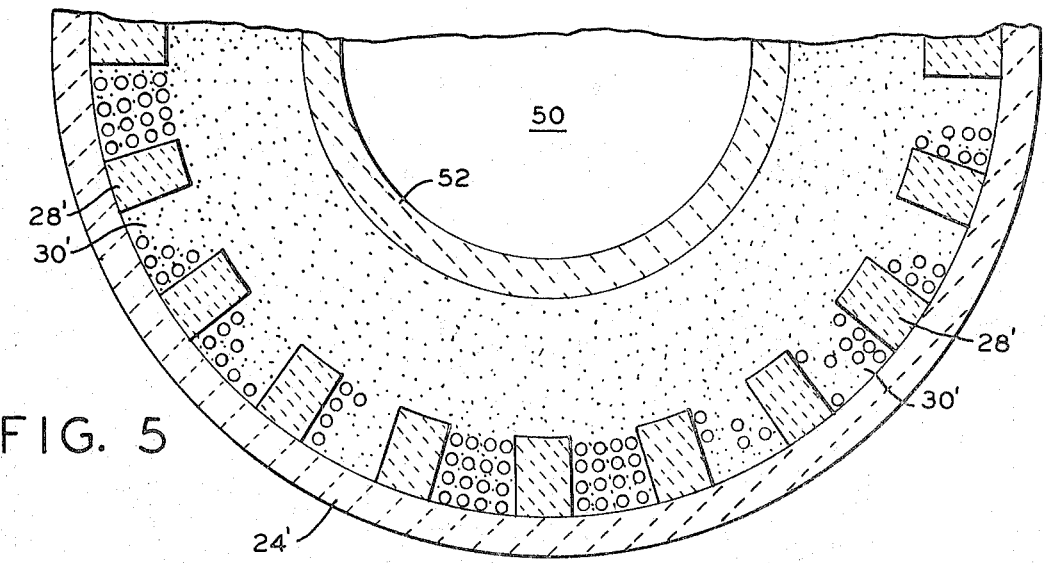
FIG. 5 is a plan view in section taken along the line 5—5 of FIG. 4.

Looking now to FIGS. 4-6 a modification of applicant's invention will be described in detail. Primed numerals are used herein to denote corresponding parts of the reactor shown in FIGS. 1-3, described above, and the reactor shown in FIGS. 4-6. Applicant realized that if the fluidized bed were expanded relative to the freeboard, as shown in the reactor of FIGS. 1-3, then the space rate would be greater in the freeboard than in the fluidized bed. In certain operating situations a relationship between the relative diameters of the fluidized bed and the freeboard which increases the space rate in the freeboard is desirable, e.g., to elutriate and carry out as overflow a specified particle size range. In other operating situations, however, such is not the case and applicant was thus faced with the problem of how to maintain an expanded fluidized bed, the coils being accepted into pockets in the expanded portion of the bed, without increasing the space rate from the fluidized bed to the freeboard. Applicant's solution, as shown in FIGS. 4-6, is to remove a cylindrical section from the fluidized bed portion of the reactor and to so proportion the remainder of the fluidized bed relative to the freeboard as to have either a constant space rate or a reduction in the space rate as the fluidizing gas passes from the fluidized bed to the freeboard.

Thus, the reactor 10' has a void or dead space 50 formed by a cylindrical wall 52 of firebrick or other refractory material concentric with the fluidized bed 16'. The primary windbox 12', and the fluidized bed, if viewed in a planar cross-section, as shown in FIG. 5, have a doughnut shaped configuration, but, in all other respects, the construction and operation of the reactor is similar to that of the reactor shown in FIGS. 1-3.

Figure 6:
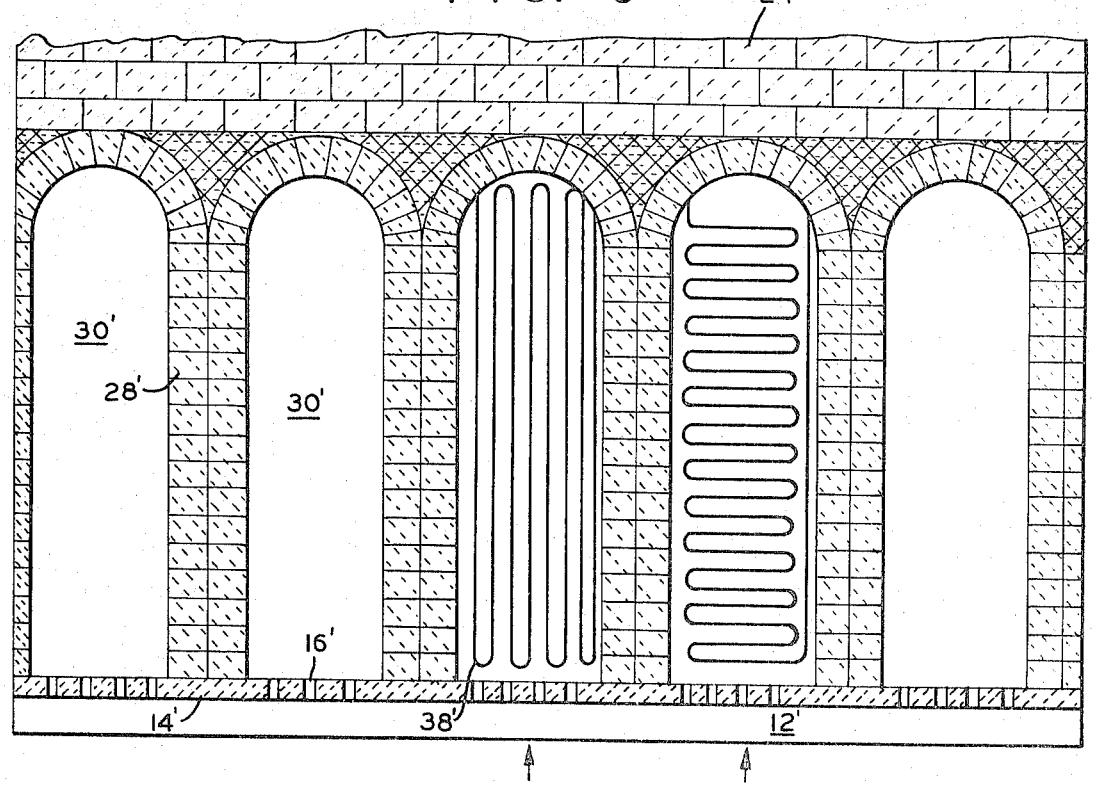
FIG. 6 is an elevational view with parts removed for clarity of showing of the special pockets in the interior wall of the fluidized bed reactor to receive the steam generating coils.

FIG. 6 depicts what a person would see if he were standing on the constriction plate and looking radially towards the outer wall 24'. The pockets 30', as described above, are constructed of firebrick or other refractory material and have an arched roof for maximum strength. The steam generating coils 38' are shown in both a horizontal and vertical configuration, the latter being the preferred form because all coil surfaces in contact with the fluidized bed would be vertical surfaces. Vertical surfaces are subject to less mechanical stresses and less abrasion due to the action or motion of the fluid bed than are coils with predominantly horizontal surfaces. This is because the basic movement or motion of solids in a fluidized bed is in the vertical rather than the horizontal plane.

As this invention may be embodied in several forms without departing from the spirit or essential character thereof, the present embodiment is illustrative and not restrictive. The scope of the invention is defined by the appended claims rather than by the description preceding them and all embodiments which fall within the meaning and equivalency of the claims are, therefore, intended to be embraced by those claims.

I claim:
1. A fluidized bed reactor comprising a windbox, a constriction plate having a plurality of orifices therein overlying said windbox, a fluidized bed supported on said constriction plate and a cylindrical freeboard extending above said fluidized bed, said fluidized bed having an outside diameter greater than the outside diameter of said freeboard and said windbox provided with a primary windbox section having an outside diameter approximately equal to the diameter of said freeboard and at least one circumferentially disposed peripheral windbox section extending transversely from the primary windbox.

2. A fluidized bed reactor as defined in claim 1 wherein said peripheral windbox comprises a plurality of individually operable windboxes circumferentially disposed about the outer surface of said primary windbox, each peripheral windbox having its own fluidizing medium supply conduit.

3. A fluidized bed reactor as defined in claim 1 further comprising at least one bank of heat absorbing coils submerged in said fluidized bed and overlying said peripheral windboxes.

4. A fluidized bed reactor as defined in claim 1 further comprising a transverse annular wall interconnected between the longitudinal outer wall of the freeboard portion of the reactor and the longitudinal outer wall of the fluidized bed portion of the reactor and overlying a portion of the fluidized bed, said transverse annular wall having portions thereof which open permitting direct access from the atmosphere to said fluidized bed.

5. A fluidized bed reactor as defined in claim 4 further comprising at least one set of longitudinally extending heat absorbing steam generating pipes submerged in the fluidized bed below the transverse annular wall.

6. A fluidized bed reactor as defined in claim 5 further comprising a plurality of longitudinally extending circumferentially spaced piers disposed along the interior surface of the fluid bed portion of the reactor, the steam generating pipes being submerged in the fluidized bed between adjacent piers.

7. A fluidized bed reactor as defined in claim 1 further comprising a plurality of longitudinally extending circumferentially spaced piers disposed along the inner surface of the reactor shell and extending radially into the fluidized bed, each adjacent set of piers defining a fluidizing pocket.

8. A fluidized bed reactor as defined in claim 7 further comprising at least one longitudinally disposed set of heat absorbing steam generating coils submerged in the fluidized bed between two adjacent piers.

9. A fluidized bed reactor as defined in claim 7 further comprising a transverse annular wall interconnected between the longitudinal outer wall of the freeboard portion of the reactor and the longitudinal outer wall of the fluidized bed portion of the reactor and overlying a portion of the fluidized bed, said transverse annular wall having portions thereof corresponding to the sections overlying the fluidizing pockets which open to the atmosphere permitting direct access to the fluidizing pockets.

10. A fluidized bed reactor as defined in claim 9 further comprising at least one bank of longitudinally extending heat absorbing steam generating coils removably submerged in the fluidized bed between two adjacent piers, the bank of coils being removable from the reactor by being raised longitudinally through the opening in said transverse annular wall overlying said fluidizing pocket.

11. A fluidized bed reactor as defined in claim 9 wherein said windbox comprises a primary windbox having an outside diameter substantially equal to the diameter of said freeboard and a plurality of peripheral windboxes extending transversely from the outer edge of said primary windbox and underlying said fluidizing pocket.

12. A fluidized bed reactor for heat treating a feed material comprising a windbox, a constriction plate having a plurality of orifices therein overlying said windbox, a fluidized bed supported on said constriction plate, a plurality of longitudinally extending circumferentially spaced piers disposed along the inner surface of the reactor and extending radially into the fluidized bed, each adjacent set of piers defining a fluidizing pocket, and a cylindrical freeboard extending above said fluidizing bed, said fluidized bed having an outside diameter greater than the outside diameter of said freeboard and said windbox provided with a primary windbox section having an outside diameter approximately equal to the diameter of the freeboard and a plurality of circumferentially disposed, peripheral windbox sections extending transversely from the outer edge of the primary windbox section and underlying said fluidizing pockets.

13. A fluidized bed reactor as defined in claim 12 wherein each of the periphery windboxes has its own fluidizing gas supply conduit and wherein said peripheral windboxes can be regulated independently of said primary windbox.

References Cited

UNITED STATES PATENTS

| | | | |
|---|---|---|---|
| 2,400,194 | 5/1946 | Day et al. | 23—1 |
| 2,404,944 | 7/1946 | Brassert. | |
| 2,518,270 | 8/1950 | Barr | 23—288 |
| 2,586,818 | 2/1952 | Harms. | |
| 2,664,346 | 12/1953 | Mayhew | 23—288 |
| 2,699,375 | 1/1955 | Johannsen et al. | 23—284 XR |
| 2,760,842 | 8/1956 | Ward | 23—288 XR |
| 2,978,315 | 4/1961 | Schenck et al. | 75—26 XR |
| 2,985,515 | 5/1961 | McKinley | 23—284 |
| 3,013,773 | 12/1961 | Campbell et al. | 165—104 XR |
| 3,042,498 | 7/1962 | Norman | 23—284 XR |
| 3,361,539 | 1/1968 | Pyzel | 23—284 |

FOREIGN PATENTS 537,743   3/1957   Canada.

JOSEPH SCOVRONEK, Primary Examiner

D. G. MILLMAN, Assistant Examiner

U.S. Cl. X.R.

263—21; 266—20